JOSEPH S. WILLIAMS, OF CINNAMINSON, NEW JERSEY.

Letters Patent No. 84,455, dated November 24, 1868.

IMPROVEMENT IN THE MANUFACTURE OF ALCOHOLIC SPIRITS FROM TOMATOES.

The Schedule referred to in these Letters Patent and making part of the same.

*To all whom it may concern:*

Be it known that I, JOSEPH S. WILLIAMS, of Cinnaminson, in the county of Burlington, and State of New Jersey, have invented a new and useful Improvement in the Manufacture of Alcoholic Spirits from Tomatoes, and other ingredients; and I do hereby declare the following to be a full, clear, and exact description thereof.

In attempts heretofore made to distil spirits from the juice of tomatoes, great difficulty has been experienced from its tardiness in taking on the vinous fermentation.

This difficulty is so formidable, that I have known large quantities of tomato-mash to be entirely destroyed and lost by putrefaction.

My invention consists in a new and improved process of treating tomato-juice, with other ingredients, whereby I am enabled to produce a large amount of spirit, of superior quality, without loss.

To make whisky or alcohol, I add three (3) gallons of heavy, cheap molasses, and one (1) gallon of yeast to about thirty-eight (38) gallons of juice of ripe tomatoes. This mixture I set away in barrels, and stir and refill daily, keeping the barrels constantly full, until the fermentation is complete, which usually takes from six to nine days.

I then distil once or twice, according to the strength required. By two careful distillations, I am enabled to produce a rich spirit, containing seventy per cent. of alcohol.

For making rum, I use from five (5) to eight (8) gallons of molasses, and one (1) gallon of yeast to thirty-eight (38) gallons of tomato-juice.

Owing to the great tendency of this material to pass into the acetous and putrefactive fermentations, unusual care is necessary to distil it immediately when the vinous fermentation is complete, as it is found that it requires but one week from that time to destroy one-half the alcohol in the juice. The same cause may explain, in part, the difficulty heretofore experienced in practically producing spirits from tomatoes.

I have found, by experience, that the juice of tomatoes alone, without other ingredients, takes from three to four weeks to ferment, and it is often impossible to prevent it passing into putrefaction before vinous fermentation can be induced. The great difficulty and frequent loss resulting from this cause, account sufficiently for the fact that tomatoes have not before been made profitably available for the manufacture of alcohol and other spirits.

I am aware that a patent was granted, on the 1st of January, 1861, to William Schilling, of Baltimore, for a process of making spirits by steeping barley-malt in hot water, mixing the wort thus obtained with mashed tomatoes, sugar, and yeast, and fermenting and distilling the mixture. This, therefore, I do not claim.

It is an essential part of my process that the juice of the tomatoes is completely separated from the pulp before fermentation and distillation; and I have found, by practical experiment, that by thus fermenting and distilling the pure juice, apart from the pulp, a better result is obtained, in the freedom of the spirit from deleterious flavors, which the pulp, seeds, and skin of the tomatoes impart; and further, that the fermentation is so much more uniform throughout the liquid than throughout a semi-fluid mass of mashed tomatoes, that I am enabled to effect a large saving of spirit by placing the liquor into the still at the moment that the alcohol is completely developed.

What I claim, and desire to secure by Letters Patent, is—

The process, herein described, of producing spirits, by first separating the juice of tomatoes from the pulp, then mixing molasses, or other saccharine matter, and yeast, and afterwards fermenting and distilling the compound liquid thus obtained.

To the above specification of my improvement in the manufacture of alcoholic spirits from tomatoes, I have signed my hand, this 2d day of November, A. D 1868.

JOS. S. WILLIAMS.

Witnesses:
WM. H. BRERETON, Jr.,
OCTAVIUS KNIGHT.